(12) United States Patent
Nishi

(10) Patent No.: US 8,218,652 B2
(45) Date of Patent: Jul. 10, 2012

(54) IMAGE ENCODER, IMAGE DECODER, AND IMAGE ENCODING SYSTEM

(75) Inventor: Takashi Nishi, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 398 days.

(21) Appl. No.: 12/457,623

(22) Filed: Jun. 17, 2009

(65) Prior Publication Data

US 2010/0074331 A1    Mar. 25, 2010

(30) Foreign Application Priority Data

Sep. 25, 2008    (JP) ................................. 2008-245688

(51) Int. Cl.
*H04N 7/12* (2006.01)
*H04N 11/02* (2006.01)
*H04N 11/04* (2006.01)

(52) U.S. Cl. ............... 375/240.26; 375/240.01

(58) Field of Classification Search ........................ None
See application file for complete search history.

(56) References Cited

U.S. PATENT DOCUMENTS

| | | | |
|---|---|---|---|
| 5,485,213 A | | 1/1996 | Murashita et al. |
| 5,999,657 A * | | 12/1999 | Yasuhiko ....................... 382/248 |
| 6,081,551 A * | | 6/2000 | Etoh ............... 375/240 |
| 6,181,747 B1 * | | 1/2001 | Burns ....................... 375/240.09 |
| 6,226,413 B1 * | | 5/2001 | Jandel ............................ 382/236 |
| 6,418,166 B1 * | | 7/2002 | Wu et al. .................. 375/240.12 |
| 6,985,526 B2 * | | 1/2006 | Bottreau et al. ............. 375/240.1 |
| 2006/0200733 A1 * | | 9/2006 | Stankovic et al. ............ 714/801 |
| 2007/0013561 A1 * | | 1/2007 | Xu et al. .......................... 341/50 |
| 2008/0291065 A1 * | | 11/2008 | Lu et al. .......................... 341/107 |
| 2009/0003452 A1 * | | 1/2009 | Au et al. .................. 375/240.17 |
| 2010/0241924 A1 * | | 9/2010 | Nishi ............................ 714/758 |

FOREIGN PATENT DOCUMENTS

| | | |
|---|---|---|
| JP | 5-284368 A | 10/1993 |
| JP | 07-087482 A | 3/1995 |

OTHER PUBLICATIONS

Aaron et al., Transform-Domain Wyner-Ziv Codec for Video', Proc. SPIE Visual Communications and Image Processing, San Jose, California, 2004, p. 1 of specification.
Sklar, Digital Communications: Fundamentals and Applications, 2nd edition, Prentice-Hall, 2001, p. 1 of specification.

* cited by examiner

*Primary Examiner* — Joseph Ustaris
*Assistant Examiner* — Kevin McInnish
(74) *Attorney, Agent, or Firm* — Rabin & Berdo, P.C.

(57) ABSTRACT

An image coding system includes an image encoder and a predictive image decoder. The image encoder encodes an input image to obtain encoded data, compares the input image with a reference image, generates error information identifying parts of the input image that are changed with respect to the reference image, and outputs the encoded data and the error information. The predictive image decoder predicts the image, using a simplified prediction method for parts of the image identified by the error information as not being changed, and decodes the encoded data and the predicted data to obtain decoded image data. Use of the simplified prediction method in unchanged parts of the image reduces the prediction processing load without significant loss of prediction accuracy.

10 Claims, 8 Drawing Sheets

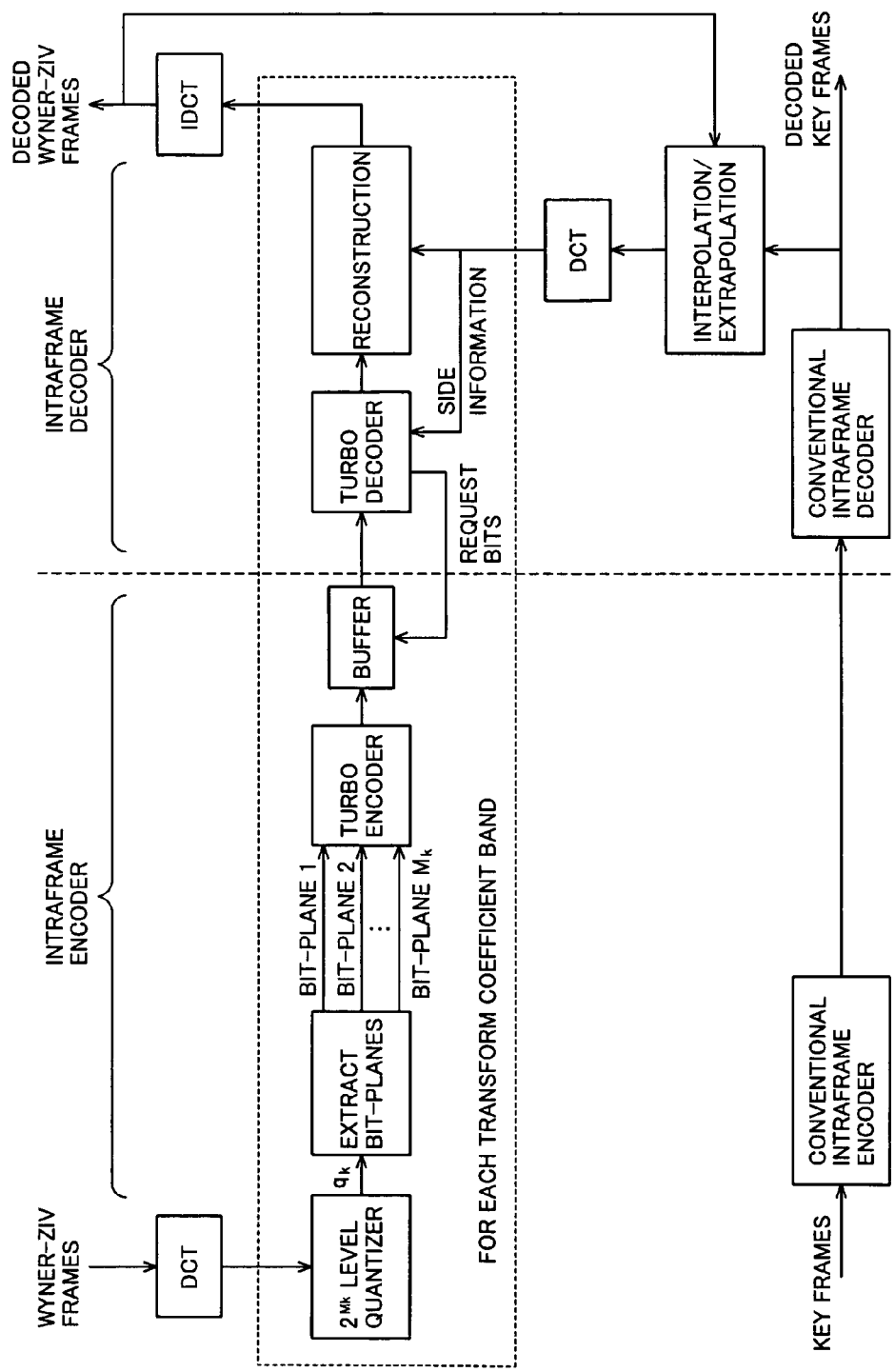

IMAGE ENCODER, IMAGE DECODER, AND IMAGE ENCODING SYSTEM

BACKGROUND OF THE INVENTION

1. Field of the Invention

The present invention relates to an image coding system, such as a distributed video coding system, having an image encoder and a predictive image decoder.

2. Description of the Related Art

Distributed video coding (DVC) has been attracting considerable attention recently. In a DVC system, Slepian-Wolf techniques are used to decode an encoded image with reference to a predicted image generated by the decoder. In 'Transform-Domain Wyner-Ziv Codec for Video', *Proc. SPIE Visual Communications and Image Processing*, San Jose, Calif., 2004, Aaron et al. describe a DVC system in which the underlying code is a turbo code. Turbo codes are explained by Sklar in *Digital Communications: Fundamentals and Applications*, 2nd edition, Prentice-Hall, 2001. Low-density parity-check (LDPC) codes can be used in place of turbo codes.

DVC systems in general place a high computational load on the decoder. This is partly because the decoding of turbo codes and LCPC codes is computationally intensive, but another factor is that the generation of predicted images is computationally intensive because of the need to carry out motion compensation on key frames. The key frames are non-predicted frames, inserted periodically in the video sequence, that are encoded and decoded by a conventional coding method such as the method developed by the Joint Photographic Experts Group (JPEG). The decoder predicts other frames from preceding or following key frames.

The computational load could be reduced by uniformly reducing the amount of prediction processing performed, but that would lead to less accurate predicted images. The loss of prediction accuracy would reduce the data compression ratio and further increase the turbo or LDPC decoding load.

There is a need to reduce the amount of processing spent in image prediction while maintaining the accuracy of the predicted images.

SUMMARY OF THE INVENTION

An object of the present invention is accordingly to provide an image coding system including a predictive image decoder that requires less predictive decoding processing, without sacrificing prediction accuracy.

A more specific object is to provide a video coding system that requires less predictive decoding processing.

Another more specific object is to provide a Slepian-Wolf image coding system that that requires less predictive decoding processing.

A further object is to provide image encoders and image decoders for use in these systems.

In one embodiment, the invention provides an image encoder including an encoding unit that encodes an input image. A comparison unit compares the input image with a reference image to determine what part of the input image is significantly changed with respect to the reference image. An information generating unit generates error information designating such a part as changed. An output unit outputs the encoded data and the error information.

This embodiment also provides an image decoder having a receiving unit that receives encoded data representing an image, together with error information identifying a changed part of the image. A prediction unit predicts the image, using a first prediction process in the changed part and a second prediction process in other parts of the image, the first prediction process being more computationally intensive than the second prediction process. A decoding unit decodes the encoded data and the predicted image data to obtain decoded image data.

The invention also provides an image coding system including the above image encoder and image decoder. This system can be used with Slepian-Wolf coding employing either a turbo code or an LDPC code. By using a less computationally intensive process to predict parts of the image that are easy to predict because they are not significantly changed, the invented system reduces the computational load on the image decoder, without loss of prediction accuracy.

In a closely related embodiment, the comparison unit in the image encoder generates the reference image itself by a simplified prediction process. In the image decoder, the prediction unit uses the simplified prediction process to predict the entire decoded image, and a prediction revision unit revises the predicted values in the part of the image designated as changed. This embodiment also reduces the computational load on the image decoder, without imposing a greatly increased computational load on the image encoder.

In a preferred form of this embodiment, the comparison unit identifies parts of the input image having bit values that differ from the predicted bit values in at least half of the bit positions as changed, and the prediction revision unit in the image decoder inverts the predicted bit values in these parts.

BRIEF DESCRIPTION OF THE DRAWINGS

In the attached drawings:

FIG. 7 illustrates a conventional distributed video coding system;

DETAILED DESCRIPTION OF THE INVENTION

Figure 1:
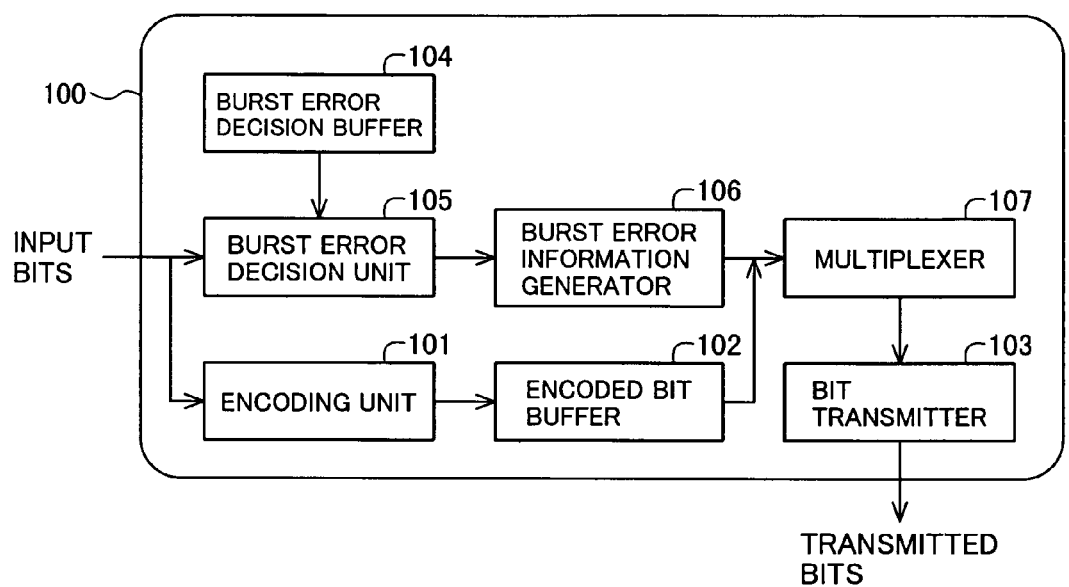
FIG. 1 is a block diagram illustrating an image encoder according to a first embodiment of the invention.

Embodiments of the invention will now be described with reference to the attached non-limiting drawings, in which like elements are indicated by like reference characters.

First Embodiment

When a simple prediction process is used in distributed video coding, if part of an image to be encoded differs greatly from the reference image from which the image will be predicted in the decoder, the result is a burst of prediction errors in that part of the image. Since the effect on the decoding process is similar to the effect of a burst error in a communication channel, a part of the image that is significantly changed with respect to the reference image can be considered to have a type of 'burst error'. This terminology does not imply that the image data are in error; it only means that the image data are hard to predict. The first embodiment detects such burst errors in the encoder, and compensates for them by putting extra computational effort into the prediction process in the decoder.

Referring to FIG. 1, the image encoder 100 in the first embodiment comprises an encoding unit 101, an encoded bit buffer 102, an output unit or bit transmitter 103, a burst error decision buffer 104, a burst error decision unit 105, a burst error information generator 106, and a multiplexer 107.

The encoding unit 101 receives image data bits as input bits and encodes the input bits by a process that separately generates information bits and encoded bits. In general, the information bits are identical to the input bits and the encoded bits provide some form of redundancy. In turbo coding, for example, the encoded bits are parity bits; in LDPC coding the encoded bits are syndrome bits. The encoded bits are output to the encoded bit buffer 102.

The encoded bit buffer 102 stores the encoded bits received from the encoding unit 101 and outputs some or all of the stored encoded bits to the multiplexer 107.

The burst error decision buffer 104 stores information the burst error decision unit 105 needs to detect burst errors in the input bits. For example, the burst error decision buffer 104 may store the image data for one or more reference frames preceding and/or following the input bits in a sequence of video frames. The reference frames need not be encoded by the encoder 100; they may be encoded by a different method. The information stored in the decision buffer 104 is output to the burst error decision unit 105.

The burst error decision unit 105 compares the input bits with the information stored in the burst error decision buffer 104 to determine what part or parts, if any, of the input image are significantly changed, and outputs the result of this determination to the burst error information generator 106.

Upon receiving the determination result from the burst error decision unit 105, the burst error information generator 106 generates burst error information identifying the part or parts determined to be significantly changed and outputs the burst error information to the multiplexer 107.

The multiplexer 107 multiplexes the burst error information output from the burst error information generator 106 and the encoded bits output from the encoded bit buffer 102 and sends the multiplexed result to the bit transmitter 103.

The bit transmitter 103 transmits the multiplexed bits received from the multiplexer 107 as the output of the image encoder 100.

Figure 2:
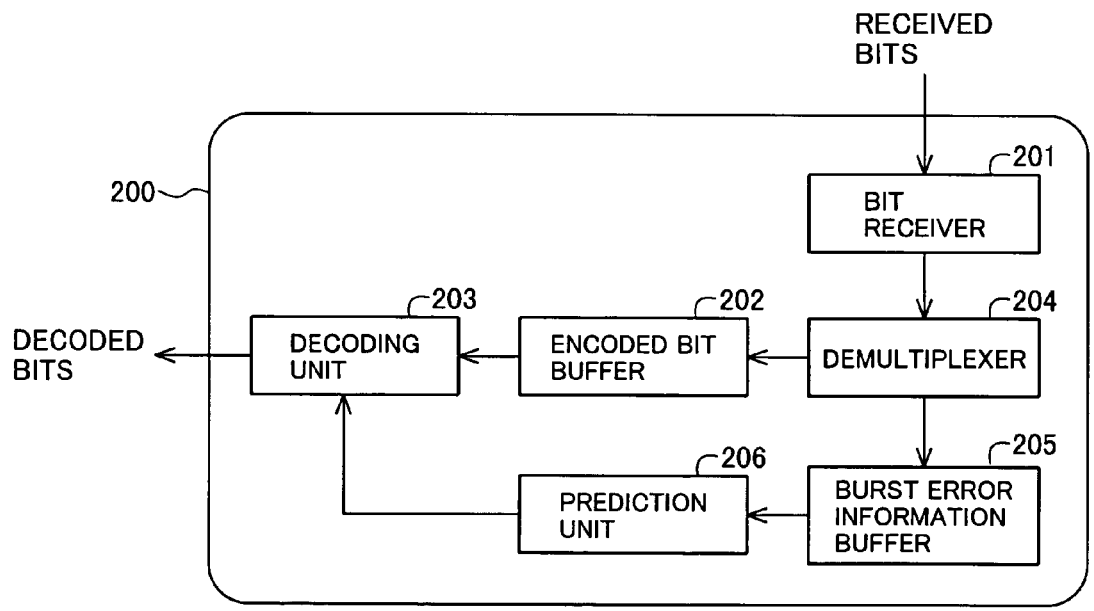
FIG. 2 is a block diagram illustrating an image decoder in the first embodiment.

Referring to FIG. 2, the image decoder 200 in the first embodiment comprises a bit receiver 201, an encoded bit buffer 202, a decoding unit 203, a demultiplexer 204, a burst error information buffer 205, and a prediction unit 206. The image decoder 200 is connected to the image encoder 100 through a communication channel (not shown); the image encoder 100 and image decoder 200 form an image encoding system.

The bit receiver 201 receives the bits transmitted by the bit transmitter 103 in the image encoder 100 and sends the received bits to the demultiplexer 204.

The demultiplexer 204 demultiplexes the received bits to separate the encoded bits from the burst error information. The encoded bits are routed to the encoded bit buffer 202; the burst error information is routed to the burst error information buffer 205.

The encoded bit buffer 202 stores the encoded bits received from the demultiplexer 204 and outputs some or all of these bits to the decoding unit 203.

The decoding unit 203 receives the encoded bits output from the encoded bit buffer 202 and predicted image data output from the prediction unit 206, performs error-correcting decoding by using the encoded bits to correct prediction errors in the predicted image data, and outputs the corrected image data as the decoded output of the image decoder 200.

The burst error information buffer 205 stores the burst error information received from the demultiplexer 204 and outputs some or all of the stored burst error information to the prediction unit 206.

The prediction unit 206 generates the predicted image data by predicting the bit values by a method that varies according to the burst error information received from the burst error information buffer 205. Further details will be given below.

The component units of the image encoder 100 and image decoder 200 in the first embodiment can be implemented by specialized hardware circuit devices or by software executed by a general-purpose computing device such as a microprocessor or microcontroller. The image encoder 100 and image decoder 200 may also include interface devices and memory devices or other data storage devices as necessary.

The bit receiver 201 and demultiplexer 204 carry out the functions of the receiving unit in the image decoder 200.

Next the operation of the image coding system including the image encoder 100 and image decoder 200 will be described with reference to the flowchart in FIGS. 3A and 3B.

Figure 3A:
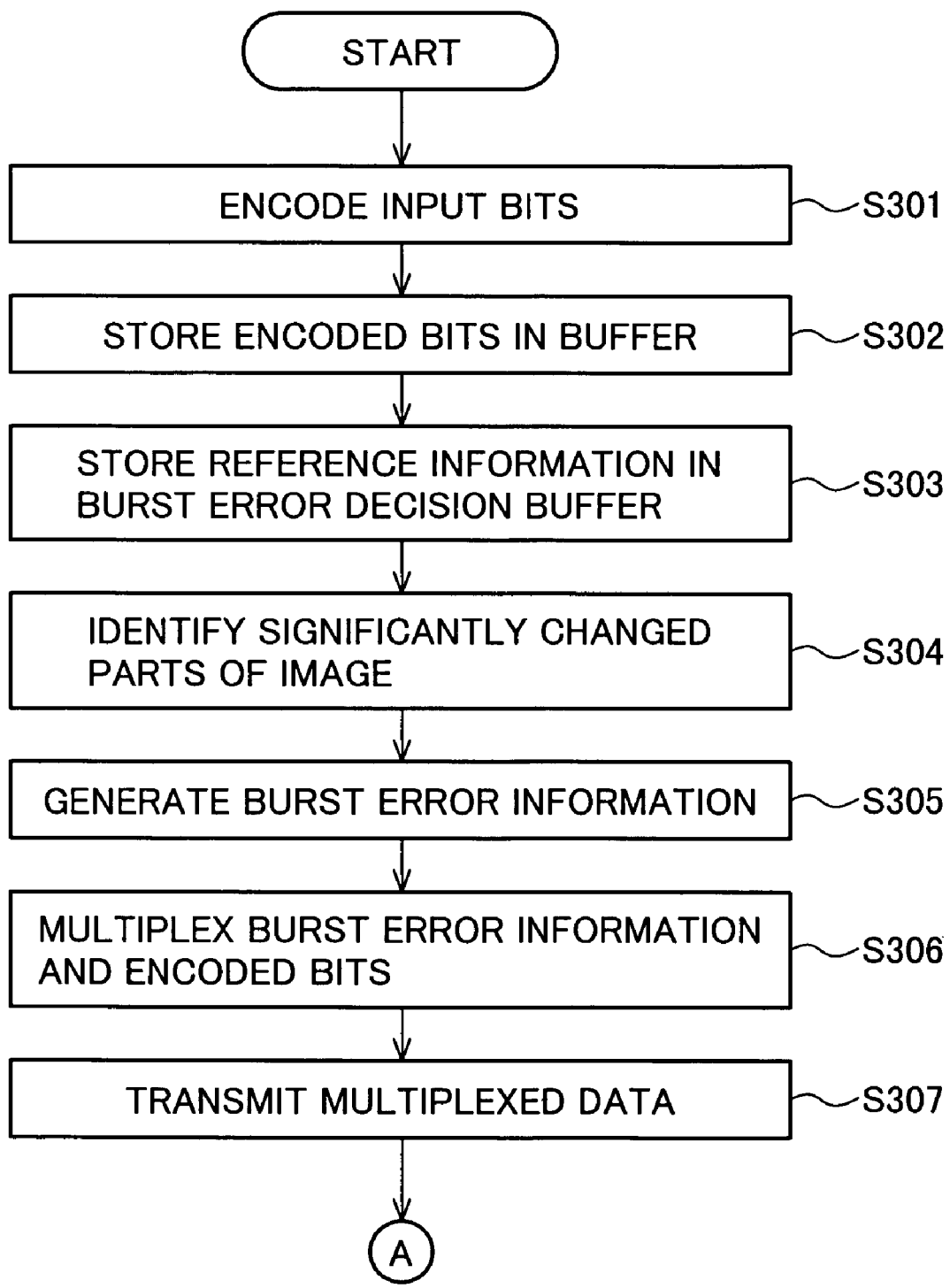
FIGS. 3A and 3B constitute a flowchart illustrating the operation of the first embodiment.

In step S301 in FIG. 3A, the encoding unit 101 receives input image data (input bits) to be encoded and performs a systematic encoding process that generates encoded bits and information bits.

In step S302, the encoding unit 101 stores the encoded bits in the encoded bit buffer 102.

In step S303, the encoding unit 101 or another unit (not shown) stores reference data such as preceding frame image data in the burst error decision buffer 104.

In step S304, the burst error decision unit 105 compares the input bits with some or all of the information stored in the burst error decision buffer 104 and determines what part of the input image is significantly changed.

For example, the input image may be partitioned into (M×N)-pixel blocks, where M and N are integers greater than unity, and the burst error decision unit 105 may compare each block with the corresponding block in the preceding frame. If the aggregate difference between the values in the block and the values in the corresponding block exceeds a predetermined threshold, the block is identified as a changed block, that is, as a burst error block.

In step S305, the burst error information generator 106 generates burst error information in accordance with the determinations made by the burst error decision unit 105. The burst error information can be provided in various forms, including the following: (a) the blocks may be numbered in raster sequence, starting from the top left corner of the image, and a list of the block numbers of the burst error blocks may be given as burst error information; (b) the burst error information may include one bit per block with, for example, a bit value of '1' indicating a burst error block and a bit value of '0' indicating a block that is not a burst error block; (c) the burst error information in (b) may be run-length coded and the run-length coded information may be given as burst error information.

In step S306, the multiplexer 107 receives the burst error information from the burst error information generator 106 and the encoded bits from the encoded bit buffer 102 and multiplexes them.

In step S307, the bit transmitter 103 transmits the multiplexed data output from the multiplexer 107 through the communication channel to the image decoder 200.

Figure 3B:
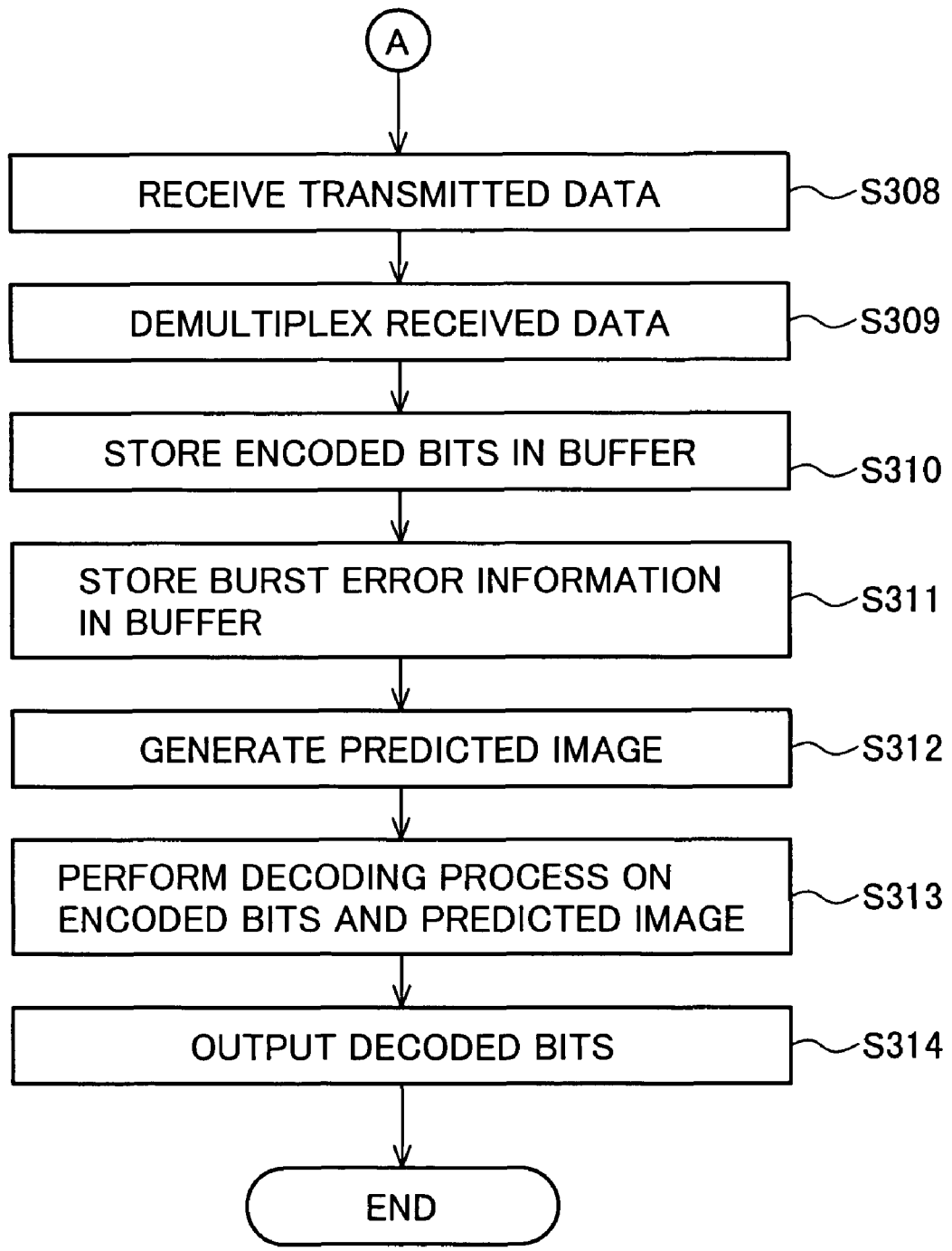

In step S308 in FIG. 3B, the bit receiver 201 in the image decoder 200 receives the multiplexed data transmitted through the communication channel.

In step S309, the demultiplexer 204 demultiplexes the data received by the bit receiver 201 into encoded bits and burst error information.

In step S310, the demultiplexer 204 stores the encoded bits in the encoded bit buffer 202.

In step S311, the demultiplexer 204 stores the burst error information in the burst error information buffer 205.

In step S312, the prediction unit 206 generates predicted values from information equivalent, although not necessarily identical, to the information stored in the burst error decision buffer 104 in the image encoder 100, using a comparatively intensive computational process for the burst error blocks identified by the burst error information and a less intensive computational process for other blocks. For example, the prediction process may be performed by carrying out motion compensation with respect to one or more preceding and/or following frames, a wide-range motion vector search being performed for burst error blocks and a narrow-range motion vector search being performed for other blocks. The image data for the preceding and/or following frames may be obtained from the decoding unit 203 or another source (not shown). Alternatively, the prediction process may be carried out with motion compensation for burst error blocks and without motion compensation for other blocks.

In step S313, the decoding unit 203 performs a decoding process by using the encoded bits stored in the encoded bit buffer 202 and the predicted values generated by the prediction unit 206.

In step S314, the decoding unit 203 outputs the decoded bits.

In the first embodiment, the image encoder 100 outputs information identifying blocks that are significantly changed, and the image decoder 200 adjusts the amount of image prediction processing accordingly. As a result, prediction accuracy is maintained for significantly changed blocks by increasing the amount of prediction processing devoted to these blocks, while the total amount of processing is reduced without loss of prediction accuracy by decreasing the amount of processing spent on blocks that are not significantly changed.

Second Embodiment

Whereas motion compensation was used as an exemplary method of generating the predicted image data in the first embodiment, the second embodiment uses a simpler prediction method. For example, a preceding frame may be used without alteration as the predicted image, or the values in preceding and following frames may be arithmetically averaged to produce the predicted image.

Figure 4:
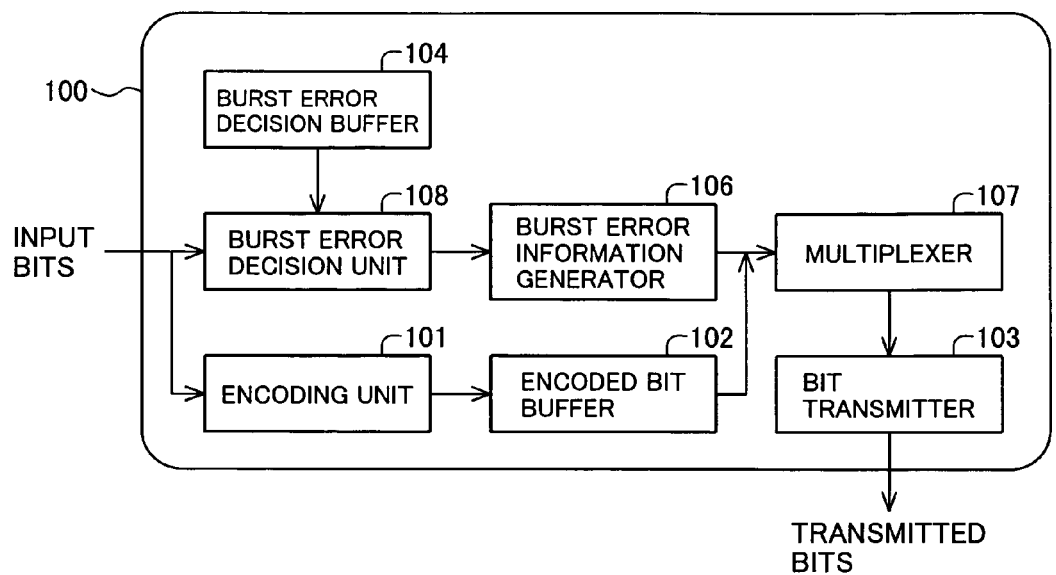
FIG. 4 is a block diagram illustrating the image encoder according to a second embodiment.

Referring to FIG. 4, the image encoder 100 in the second embodiment includes a burst error decision unit 108 that differs from the burst error decision unit 105 in the first embodiment. The method by which the burst error information generator 108 identifies significantly changed parts of the input image will be described below.

Figure 5:
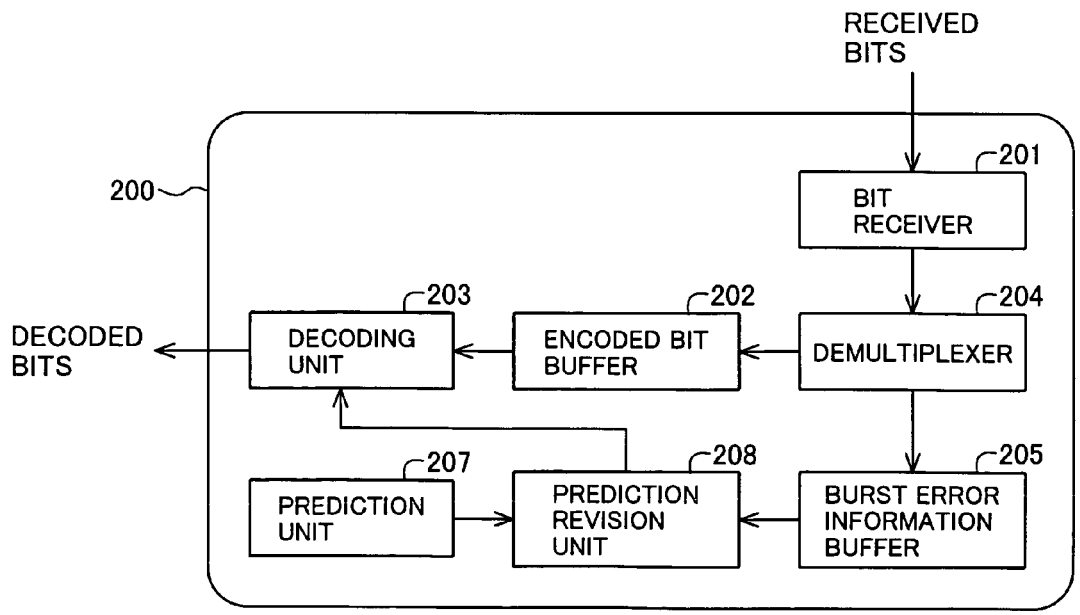
FIG. 5 is a block diagram illustrating the image decoder in the second embodiment.

Referring to FIG. 5, the image decoder 200 in the second embodiment includes a prediction unit 207 that differs from the prediction unit 206 in the first embodiment, and also includes a prediction revision unit 208.

The burst error information buffer 205 outputs some or all of the stored burst error information to the prediction revision unit 208.

The prediction unit 207 generates predicted data by a simplified method such as one of the two methods noted above and outputs the predicted data to the prediction revision unit 208.

The prediction revision unit 208 revises parts of the predicted data identified as burst error sites by the burst error information stored in the burst error information buffer 205. Other parts of the predicted data pass unaltered through the prediction revision unit 208.

The decoding unit 203 receives the encoded bits output from the encoded bit buffer 202, the revised values output by the prediction revision unit 208 for the burst error parts of the predicted data, and the non-revised predicted values of other parts of the predicted data, and performs error-correcting decoding on the basis of this information.

As in the first embodiment, the component units of the image encoder 100 and image decoder 200 may be implemented by specialized hardware or by software executed by a microprocessor or microcontroller or the like, and the image encoder 100 and image decoder 200 may include additional interfaces and data storage devices as necessary.

Next the operation of the image coding system comprising the image encoder 100 and image decoder 200 in the second embodiment will be described with reference to the flowchart in FIGS. 6A and 6B.

Figure 6A:
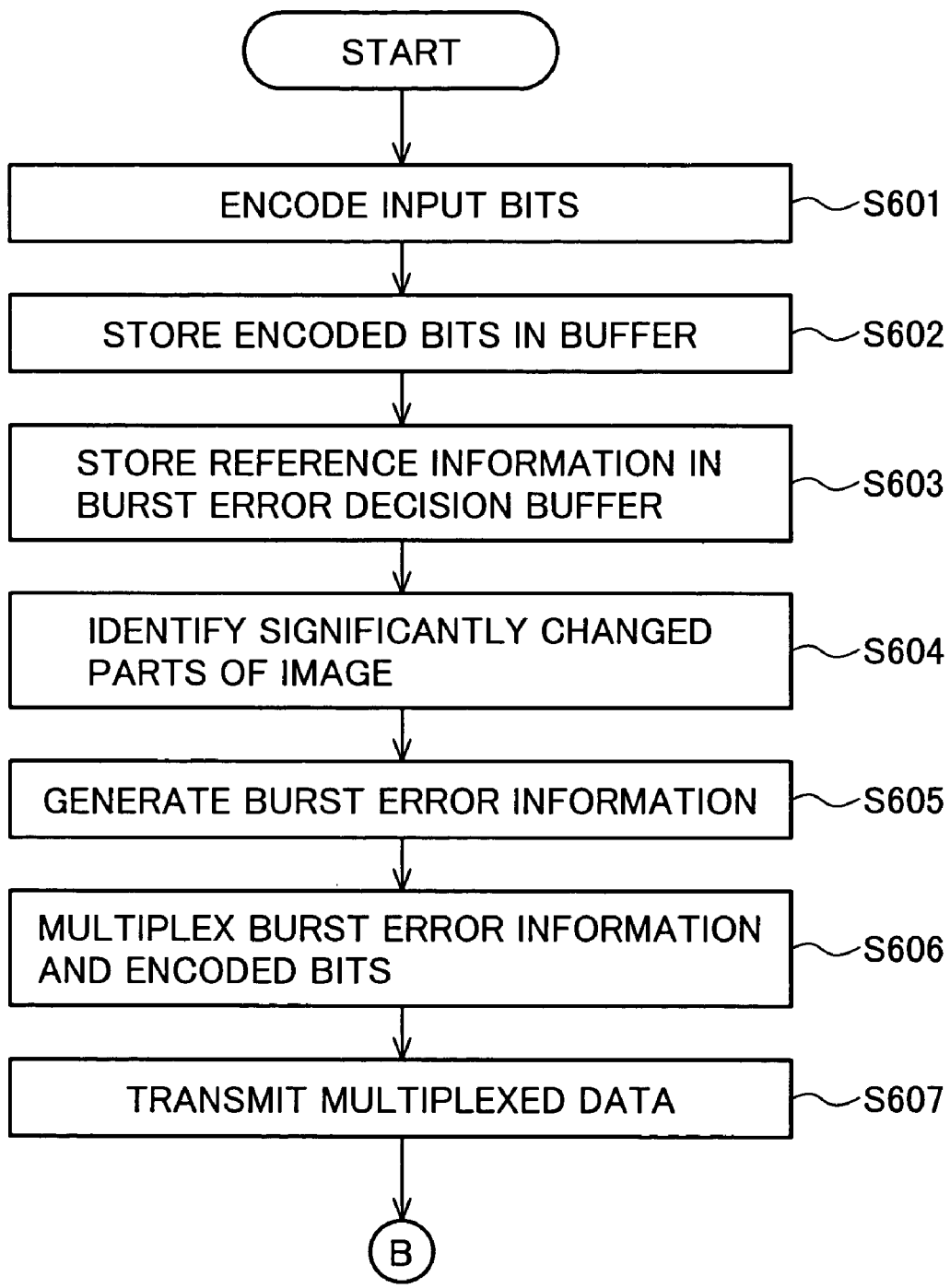
FIGS. 6A and 6B constitute a flowchart illustrating the operation of the second embodiment.

In step S601 in FIG. 6A, the image data to be encoded are input to the encoding unit 101 one bit plane at a time. For example, image data with eight bits (256 gradation levels) per pixel are input as eight consecutive bit planes. The encoding unit 101 generates information bits and encoded bits for each bit plane separately.

Steps S602 and S603 are the same as steps S302 and S303 in FIGS. 3A and 3B.

In step S604, the burst error decision unit 108 uses the input bits and some or all of the information stored in the burst error decision buffer 104 to identify burst errors. It will be assumed below that each bit plane is partitioned into (M×N)-bit blocks similar to the (M×N)-pixel blocks in the first embodiment, and the burst error identification is made for each block separately.

The burst error decision unit 108 in the second embodiment uses the same simplified method as used by the prediction unit 207 in the image decoder 200 to generate predicted block values, compares the actual block values with the predicted block values, and designates a block as a burst error block if its actual values differ significantly from the predicted values. In one exemplary scheme, a block is designated as a burst error block if at least fifty percent of its bit values differ from the bit values in the corresponding block in the corresponding bit plane of the predicted image.

In step S605, the burst error information generator 106 generates burst error information in accordance with the determinations made by the burst error decision unit 105. The burst error information may take various forms as described in step S305 in the first embodiment.

Steps S606 to S611 are the same as steps S306 to S311 in FIGS. 3A and 3B.

Figure 6B:
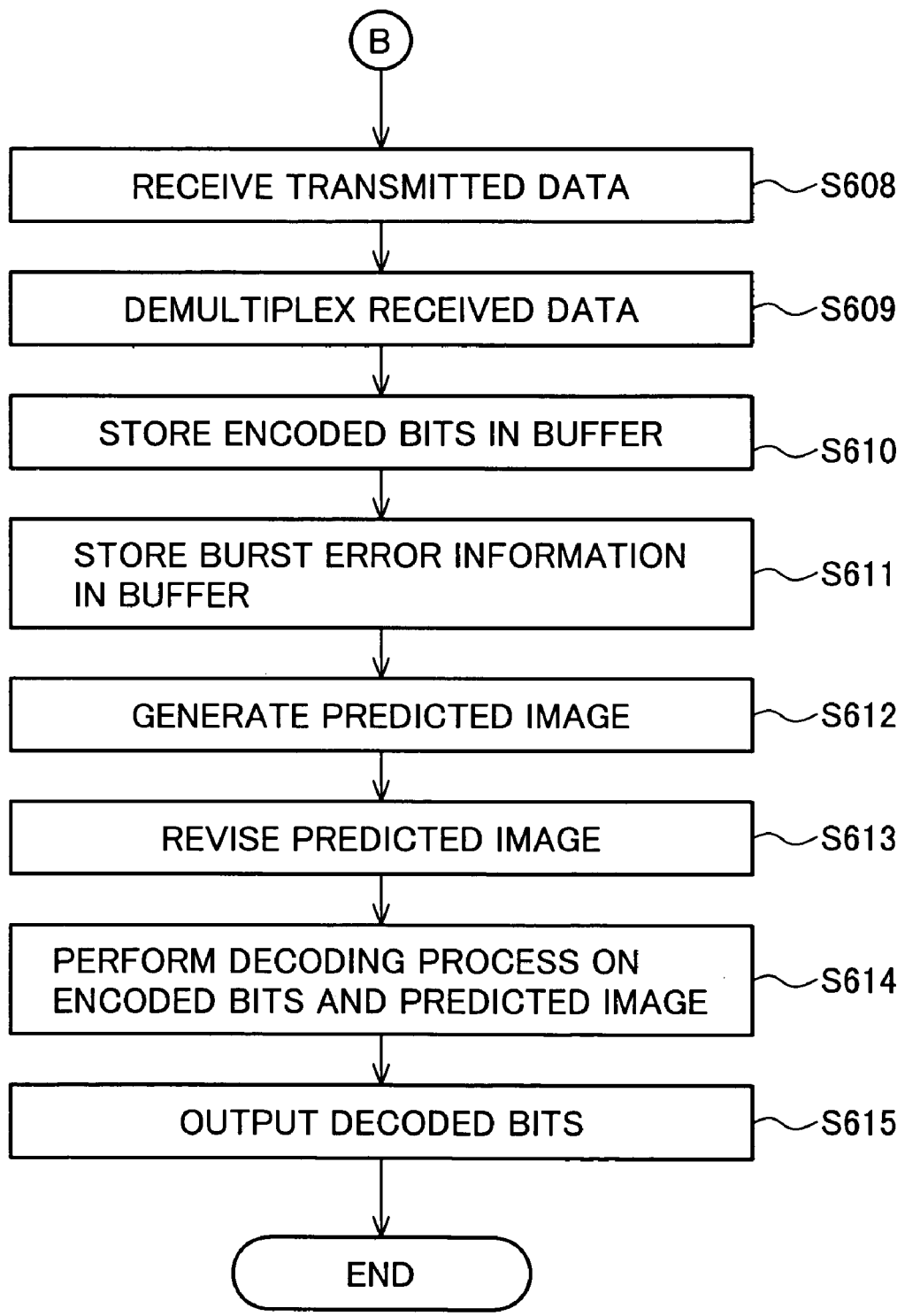

In step S612 in FIG. 6B, the prediction unit 207 generates predicted values by the simplified method also used by the burst error decision unit 108 in the image encoder 100. The simplified method is less accurate than conventional methods such as motion compensation but requires less processing. The loss of prediction accuracy will be compensated for in step S613.

In step S613, the prediction revision unit 208 revises the predicted values on the basis of the burst error information stored in the burst error information buffer 205.

In the exemplary scheme in which a block in a bit plane is identified as a burst error block if at least fifty percent of its bit values differ from the predicted values, the prediction revision unit 208 revises a burst error block by inverting all the bit values in the block, thereby usually increasing and never decreasing the number of correctly predicted bits. If, for example, a burst error block in a certain bit plane has bit values that differ from the predicted values in eighty-five percent of the bit positions, then inverting all the predicted values in this block converts data that are only fifteen percent correct to data that are eighty-five percent correct.

Steps S614 and S615 are the same as steps S613 and S614 in FIG. 3B, except that the decoding unit 203 uses the revised predicted values for burst error blocks.

In the second embodiment, the amount of decoding processing is reduced by generating all predicted values by a simplified method. To compensate for the consequent loss of prediction accuracy, the same simplified predictions are made in the image encoder to accurately identify burst prediction errors, and the image decoder revises its predictions in the burst error areas. In the exemplary scheme described above, in which a burst error is defined as a part of a bit plane having fifty percent or more incorrectly predicted bit values and the prediction revision process is a simple bit-inverting process, the revision can be carried out at a very low computational cost.

Although decreased prediction accuracy must be compensated for by an increased number of turbo or LDPC decoding iterations, the revision mitigates the loss of accuracy so that only a moderate number of extra iterations are necessary. The computational cost of the extra iterations is outweighed by the computational saving resulting from the use of a simplified prediction and revision process instead of a computationally intensive prediction process.

Third Embodiment

The third embodiment is identical to the first embodiment with the added condition that a Slepian-Wolf coding method is used. That is, the burst error detection and prediction processing features of the first embodiment are added to a conventional Slepian-Wolf coding system. Since the third embodiment can be understood from the description of the first embodiment and a knowledge of conventional Slepian-Wolf coding, the description of the third embodiment will focus on a description of the conventional DVC coding system described by Aaron et al. in the reference cited above.

Referring to FIG. 7, in this conventional DVC coding system, some frames, referred to as key frames, are encoded and decoded by intraframe processing, while other frames, referred to as Wyner-Ziv frames, are encoded by intraframe processing and decoded by interframe processing. In the encoding process, a discrete cosine transform (DCT) is used to transform each Wyner-Ziv frame to the coefficient domain, the coefficients are grouped into bands, the coefficients in the k-th band are quantized by a $2^{M_k}$-level quantizer, the quantized coefficients ($q_k$) are expressed in fixed numbers of bits, and the bit planes are extracted and supplied to a turbo encoder that that produces information bits and parity bits. The parity bits are temporarily stored in a buffer for transmission to the decoder. The information bits are discarded, as implied by Aaron et al. although not explicitly indicated in the drawing.

Although a turbo encoder and decoder are shown in FIG. 7, an LDPC code can be used, with syndrome bits instead of parity bits.

In the decoding process, for each Wyner-Ziv frame, a predicted image is generated and transformed to the coefficient domain by a discrete cosine transform, and the coefficients are grouped into bands and supplied as predicted information (side information) to a Slepian-Wolf decoder.

The Slepian-Wolf decoder initially requests some of temporarily stored parity bits. The encoder transmits the requested parity bits. Slepian-Wolf decoding is performed with the received parity bits and the side information. If the decoded result is unsatisfactory, e.g., if too many uncorrectable errors remain, additional parity bits are requested and transmitted, and further Slepian-Wolf decoding is performed, using the additional parity bits. This process is iterated until a satisfactory decoded result is achieved.

The parity bits need not be sent at the request of the decoder; the encoding and decoding process can be carried out in essentially the same way with parity bit transmission controlled entirely by the encoder.

The Slepian-Wolf decoding process produces a set of DCT coefficients, which are then converted to decoded image data by an inverse discrete cosine transform (IDCT).

Figure 8:
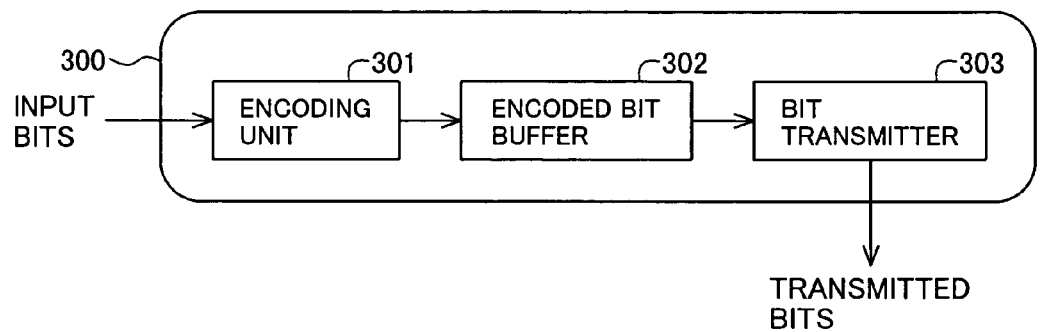
FIG. 8 is a block diagram illustrating a conventional image encoder.

Referring to FIG. 8, reduced to its essentials, the conventional image encoder 300 comprises an encoding unit 301, an encoded bit buffer 302, and a bit transmitter 303. No burst error determinations are made.

The encoding unit 301 performs Slepian-Wolf encoding. If a turbo code is used, a systematic encoder that generates information bits and parity bits separately is used for Slepian-Wolf encoding. If an LDPC code is used, the encoder generates syndrome bits. A turbo code will be assumed in the following description.

The information bits generated by the encoding unit 301 are discarded. The parity bits are output to the encoded bit buffer 302, and some or all of the parity bits are transmitted from the bit transmitter 303.

Figure 9:
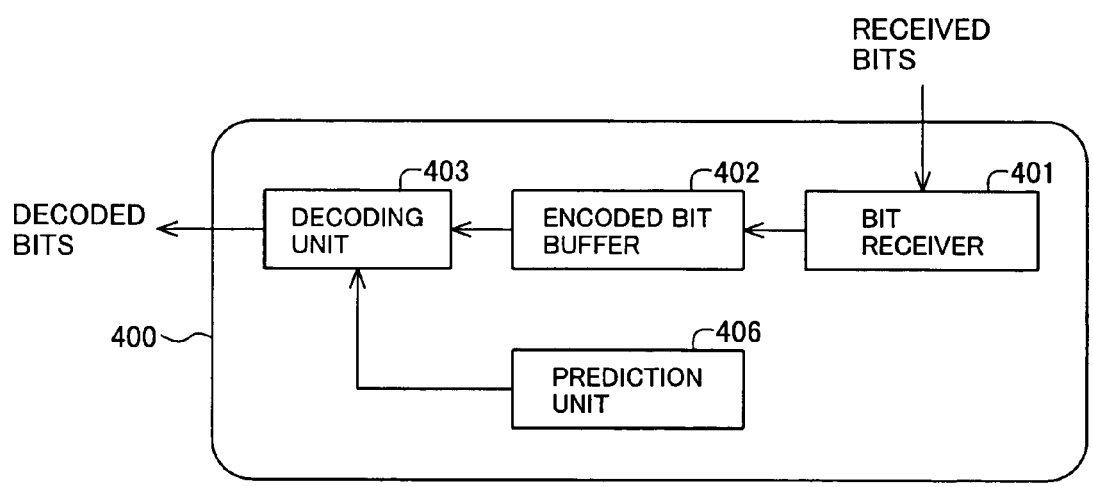
FIG. 9 is a block diagram illustrating a conventional image decoder.

Referring to FIG. 9, the conventional image decoder 400 comprises a bit receiver 401, an encoded bit buffer 402, a decoding unit 403, and a prediction unit 406. No burst error information is received or used.

The bit receiver 401 receives the parity bits and stores them in the encoded bit buffer 402. The encoded bit buffer 402 outputs the stored parity bits to the decoding unit 403. The prediction unit 406 generates predicted image data. The decoding unit 403 decodes the parity bits and the predicted image data to obtain decoded image data.

Conventional prediction units 406 have used various prediction methods: some use the values in a preceding image frame as predicted values; some interpolate mean values of the image values in preceding and following frames as predicted value; some carry out motion compensation with reference to preceding and following frames.

The decoding unit 403 may use the maximum a-posteriori probability (MAP) algorithm, described by Sklar and used in turbo decoding etc. The MAP algorithm may be applied iteratively. The MAP algorithm calculates the probability that each information bit is '0' or '1' on the basis of the parity bits received by the decoder and the information bits predicted by the decoder. Iteration improves the accuracy of the probabilities, leading to higher error-correcting performance.

When burst errors are not identified, as in FIGS. 8 and 9, the prediction unit 406 must carry out a large amount of processing to produce good predicted values for all parts of each Wyner-Ziv frame, or the decoding unit 403 must request many extra parity bits and perform many decoding iterations to correct the errors in poorly predicted parts. The resulting processing load on the image decoder 400 is conventionally regarded as a necessary feature of Slepian-Wolf coding systems, but if a conventional Slepian-Wolf coding system is modified by providing burst error information as in the first or second embodiment, the decoding processing load can be significantly reduced.

The invention is not restricted to the use of an encoding unit that outputs information bits and encoded bits separately. The invention is applicable to any image coding system in which the image decoder carries out an independent image prediction process. One example is a system in which motion compensation is performed at the encoder but the motion vectors are not transmitted to the decoder, forcing the decoder to perform its own motion vector search.

Those skilled in the art will recognize that further variations are possible within the scope of the invention, which is defined in the appended claims.

What is claimed is:

1. An image encoder comprising:
   an encoding unit for encoding an input image to obtain encoded data;
   a comparison unit for comparing the input image with at least one reference image to identify a part of the input image that is significantly changed with respect to the at least one reference image;
   an information generating unit for generating error information identifying the changed part identified by the comparison unit; and
   an output unit for outputting the encoded data and the error information,
   wherein the information generating unit divides the input image into bit planes and generates the error information identifying, as the changed part, image blocks in each bit plane that have bit values differing in at least fifty percent of bit positions from bit values in the at least one reference image.

2. The image encoder of claim 1, wherein the at least one reference image and the input image are images in a video sequence.

3. The image encoder of claim 1, wherein the at least one reference image is another image input to the image encoder.

4. The image encoder of claim 1, wherein the comparison unit predicts the at least one reference image from at least one of a preceding image and a following image input to the image encoder.

5. The image encoder of claim 1, wherein the encoding unit performs Slepian-Wolf encoding.

6. An image coding system comprising:
   an image encoder that includes an encoding unit for encoding an input image to obtain encoded data;
   a comparison unit for comparing the input image with at least one reference image to identify a part of the input image that is significantly changed with respect to the at least one reference image;
   an information generating unit for generating error information identifying the changed part identified by the comparison unit;
   and an output unit for outputting the encoded data and the error information;
   wherein the information generating unit divides the input image into bit planes and generates the error information identifying, as the changed part, image blocks in each bit plane that have bit values differing in at least fifty percent of bit positions from bit values in the at least one reference image;
   and an image decoder, that includes: a receiving unit for receiving the encoded data and error information output by the image encoder;
   a prediction unit for generating predicted values of decoded image data, using a first prediction process in the changed part identified by the error information and a second prediction process in image parts other than the changed part, the first prediction process being more computationally intensive than the second prediction process;
   and a decoding unit for decoding the encoded data and the predicted values to obtain the decoded image data, wherein the prediction unit searches for motion vectors, and the first prediction process has a larger search range than the second prediction process.

7. The image coding system of claim 6, wherein:
   the encoding unit performs Slepian-Wolf encoding; and
   the decoding unit performs Slepian-Wolf decoding.

8. An image coding system including an image encoder comprising:
   an encoding unit for encoding an input image to obtain encoded data;
   a comparison unit for comparing the input image with at least one reference image to identify a part of the input image that is significantly changed with respect to the at least one reference image;
   an information generating unit for generating error information identifying the changed part identified by the comparison unit;
   and an output unit for outputting the encoded data and the error information, wherein the information generating unit divides the input image into bit planes and generates the error information identifying, as the changed part, image blocks in each bit plane that have bit values differing in at least fifty percent of bit positions from bit values in the at least one reference image;
   and an image decoder, the image decoder comprising: a receiving unit for receiving the encoded data and the error information output by the image encoder; a prediction unit for generating predicted values by predicting a result of decoding the encoded data; a prediction revision unit for revising the predicted values in the changed part identified by the error information to obtain revised predicted values; and a decoding unit for decoding the encoded data, the revised predicted values, and the predicted values that the prediction revision unit did not revise, thereby obtaining decoded image data, wherein the prediction revision unit revises the predicted values by inverting bit values.

9. The image coding system of claim 8, wherein: the comparison unit in the image encoder also generates the predicted values by predicting the result of decoding the encoded data.

10. The image coding system of claim 8, wherein:
    the encoding unit performs Slepian-Wolf encoding; and
    the decoding unit performs Slepian-Wolf decoding.

* * * * *